US010369941B2

(12) United States Patent
Adachi et al.

(10) Patent No.: US 10,369,941 B2
(45) Date of Patent: Aug. 6, 2019

(54) WIRE HARNESS (71) Applicant: YAZAKI CORPORATION, Tokyo (JP)

(72) Inventors: Hideomi Adachi, Shizuoka (JP);
Takeshi Ogue, Shizuoka (JP);
Masahide Tsuru, Shizuoka (JP);
Hiroyuki Yoshida, Shizuoka (JP);
Kenta Yanazawa, Shizuoka (JP);
Toshihiro Nagashima, Shizuoka (JP);
Tetsuo Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/838,087

(22) Filed: Dec. 11, 2017

(65) Prior Publication Data
US 2018/0162297 A1 Jun. 14, 2018

(30) Foreign Application Priority Data

Dec. 12, 2016 (JP) .................. 2016-240028

(51) Int. Cl.
H01B 7/00 (2006.01)
B60R 16/02 (2006.01)
H01B 7/18 (2006.01)
H02G 3/04 (2006.01)

(52) U.S. Cl.
CPC ........... *B60R 16/0215* (2013.01); *H01B 7/18* (2013.01); *H02G 3/0481* (2013.01)

(58) Field of Classification Search
CPC .......... H01B 7/0045; H01B 7/04; H01B 7/17; H01B 7/18; H01B 7/20

USPC ........................................... 174/74 A, 110 R
See application file for complete search history.

(56) References Cited

U.S. PATENT DOCUMENTS

2005/0011687 A1    1/2005  Yamaguchi et al.
2013/0306371 A1*  11/2013  Toyama ............. B60R 16/0207
                                                              174/72 A
2015/0246647 A1*   9/2015  Sugino ............... B60R 16/0215
                                                              174/102 R (Continued)

FOREIGN PATENT DOCUMENTS

JP         2004-224156 A      8/2004
JP    WO2012/091173 A *  7/2012  .............. H01B 7/04

(Continued)

OTHER PUBLICATIONS

Japanese Office Action for the related Japanese Patent Application No. 2016-240028 dated Dec. 4, 2018.

(Continued)

*Primary Examiner* — William H. Mayo, III
(74) *Attorney, Agent, or Firm* — Kenealy Vaidya LLP (57) ABSTRACT A wire harness includes a first conductor path having a high priority in protection, a second conductor path having a priority in protection which is lower than that of the first conductor path, and an external member having a tubular shape and accommodating the first conductor path and the second conductor path altogether so as to protect them. The external member has a form in which the first conductor path is positioned farther away from a road surface than the second conductor path within a predetermined range in a longitudinal direction thereof.

8 Claims, 4 Drawing Sheets (56) References Cited

U.S. PATENT DOCUMENTS

| | | | |
|---|---|---|---|
| 2016/0016760 A1* | 1/2016 | Srb-Gaffron | B66B 23/04 |
| | | | 198/336 |
| 2016/0164269 A1* | 6/2016 | Inao | B60R 16/0207 |
| | | | 174/68.3 |
| 2016/0264074 A1* | 9/2016 | Oga | H01B 7/04 |
| 2017/0076837 A1* | 3/2017 | Yanazawa | B60R 16/0215 |

FOREIGN PATENT DOCUMENTS

| | | | | |
|---|---|---|---|---|
| JP | 2014/50264 A | * | 3/2014 | ......... H01B 13/012 |
| JP | 2015-165469 A | | 9/2015 | |
| JP | 2016-144294 A | | 8/2016 | |

OTHER PUBLICATIONS

Japanese Office Action for the related Japanese Patent Application No. 2016-240028 dated Apr. 2, 2019.

\* cited by examiner

<Comparative Example>

FIG.4A

<Comparative Example>

FIG.4B

WIRE HARNESS

CROSS REFERENCE TO RELATED APPLICATIONS

This application claims priority from Japanese Patent Application No. 2016-240028 filed on Dec. 12, 2016, the entire contents of which are incorporated herein by reference.

BACKGROUND OF THE INVENTION

Field of the Invention

The present invention relates to a wire harness which is laid out in a motor vehicle and more particularly to a wire harness including at least two types of conductor paths including a high-voltage conductor path and a cylindrical external member which accommodates these conductor paths altogether for protection.

Description of Related Art

In recent years, hybrid electric vehicles and electric vehicles draw people's attention as environmentally friendly vehicles. Additionally, the propagation rate of environmentally friendly vehicles has been increasing. In hybrid electric vehicles and electric vehicles, a motor is mounted as a power source, and in order to drive the motor, for example, a battery and an inverter need to be electrically connected by means of a high-voltage (a high voltage) wire harness. A high-voltage wire harness includes a high-voltage electric wire which constitutes a high-voltage conductor path and an external member which accommodates this high-voltage electric wire.

In relation to high-voltage wire harnesses, a number of proposals have been made. As one example of those proposals, a wire harness is raised which is disclosed in Patent Literature 1 below.
[Patent Literature 1] JP-A-2004-224156

According to a related art, in an event that a hybrid electric vehicle or an electric vehicle rides on a curb or a foreign matter comes to collide with an under body of the hybrid electric vehicle or the electric vehicle from a road surface side, there are fears that an external member making up a wire harness is damaged, whereupon a high-voltage electric wire is cut. In considering a possibility where the high-voltage electric wire is cut to expose a conductor, which is then brought into contact with a conductive member, device or body frame, it is found that a seriously dangerous situation is caused where an electric current of a high voltage flows.

The invention has been made in view of the situation described above, and a problem that the invention is to solve is how to provide a wire harness which can improve the reliability while ensuring the safety thereof.

SUMMARY

In accordance with one or more embodiments, a wire harness includes a first conductor path having a high priority in protection, a second conductor path having a priority in protection which is lower than that of the first conductor path, and an external member having a tubular shape and accommodating the first conductor path and the second conductor path altogether so as to protect them. The external member has a form in which the first conductor path is positioned farther away from a road surface than the second conductor path within a predetermined range in a longitudinal direction thereof.

In the wire harness, a portion of the wire harness corresponding to the predetermined range of the external member may be formed according to a routing length on an underside of a vehicle floor.

In the wire harness, a voltage value of the first conductor path is higher that that of the second conductor path.

In the wire harness, the first conductor path includes two conductor paths and the second conductor path includes one conductor path.

In accordance with one or more embodiments, in an event that a vehicle rides on a curb or in the event that a foreign matter comes to collide with the wire harness from the road surface side, even though the external member making up the wire harness is damaged, only the second conductor path (a low-voltage conductor path) having the lower priority in protection is affected before the first conductor path (a high-voltage conductor path) having the high priority in protection is done. The second conductor path functions as it were a shield for the first conductor path, and when the second conductor path is subjected to impact, for example, the impact so received is absorbed and dispersed by the second conductor path. Even though the second conductor path is damaged to be cut, as long as a damage to the first conductor path is avoided, not only can the vehicle be, of course, driven to run, but also a large electric current can be prevented from flowing to a conductive member or a vehicle body frame, whereby the safety is ensured.

In accordance with one or more embodiments, a wire harness is characterized by configuration of an external member since a first conductor path is controlled to be disposed farther away from a road surface than a second conductor path. Adopting this configuration provides a construction in which no exclusive member for preventing a disconnection is required. In addition, since no such exclusive member is required, the one or more embodiments can provides the advantageous wire harness without any increase in the number of man-hours, weight and cost when compared with the conventional wire harness.

In accordance with one or more embodiments, an advantageous effect can be provided which can ensure the safety and improve the reliability. Additionally, in accordance with one or more embodiments, an advantageous effect can be provided which can ensure the safety and improve the reliability on the underside of the vehicle floor.

DETAILED DESCRIPTION

A wire harness includes a cylindrical external member, and a first conductor path and a second conductor path which are accommodated altogether in the external member for protection. The first conductor path is a high-voltage conductor path having a high priority in protection, and the second conductor path is a low-voltage conductor path having a priority in protection which is lower than that of the first conductor path. An external member is formed into a shape which can control the position of the first conductor path so that the first conductor path stays farther away from a road surface than the second conductor path over a predetermined range in a longitudinal direction thereof, specifically speaking, a range extending over an underside of a vehicle floor. Including the external member shaped in the way described above ensures the arrangement of the conductor paths on the underside of the vehicle floor in which the first conductor path is disposed above or upper while the second conductor path is disposed below or lower.

Embodiment

Figure 1:
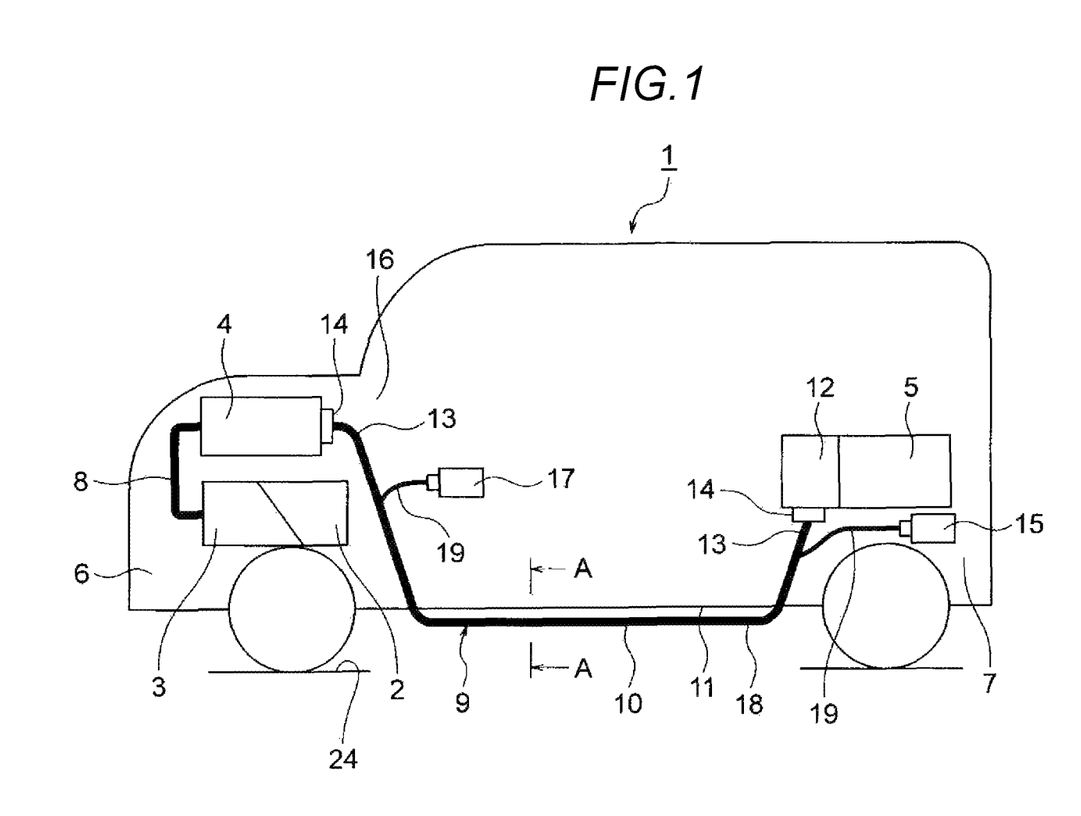
FIG. 1 is a schematic view illustrating a state where a wire harness is laid out.
Figure 2:
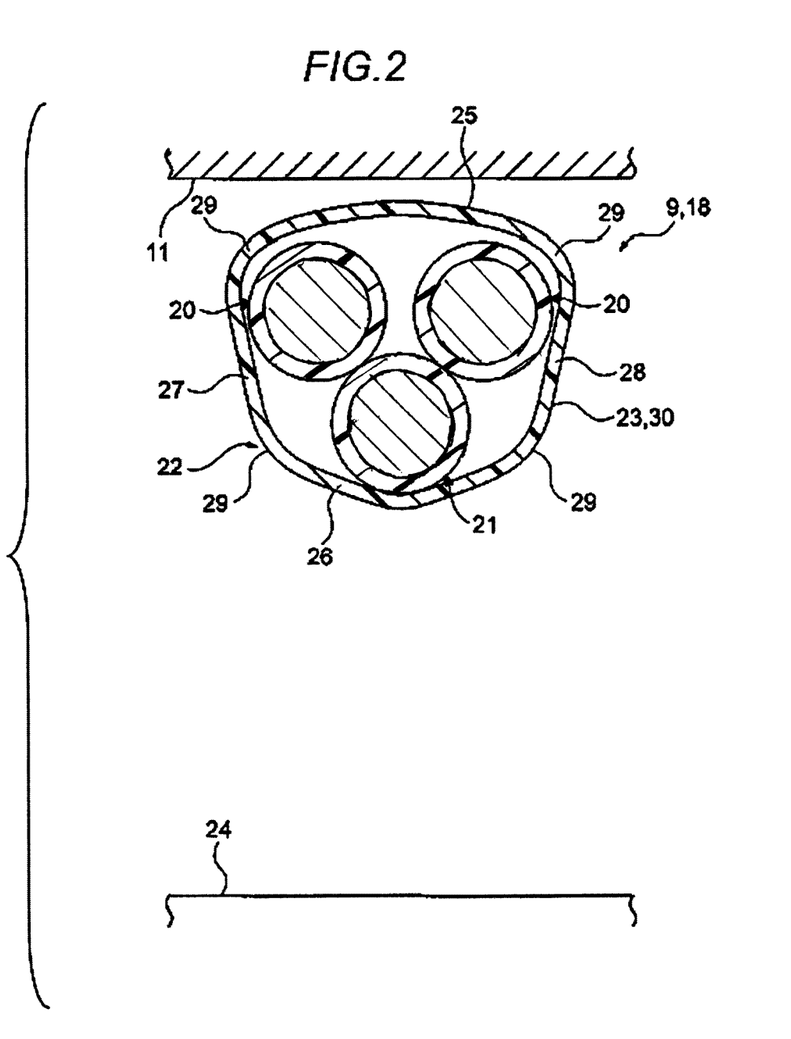
FIG. 2 is a sectional view taken along a line A-A in FIG. 1.
Figure 3:
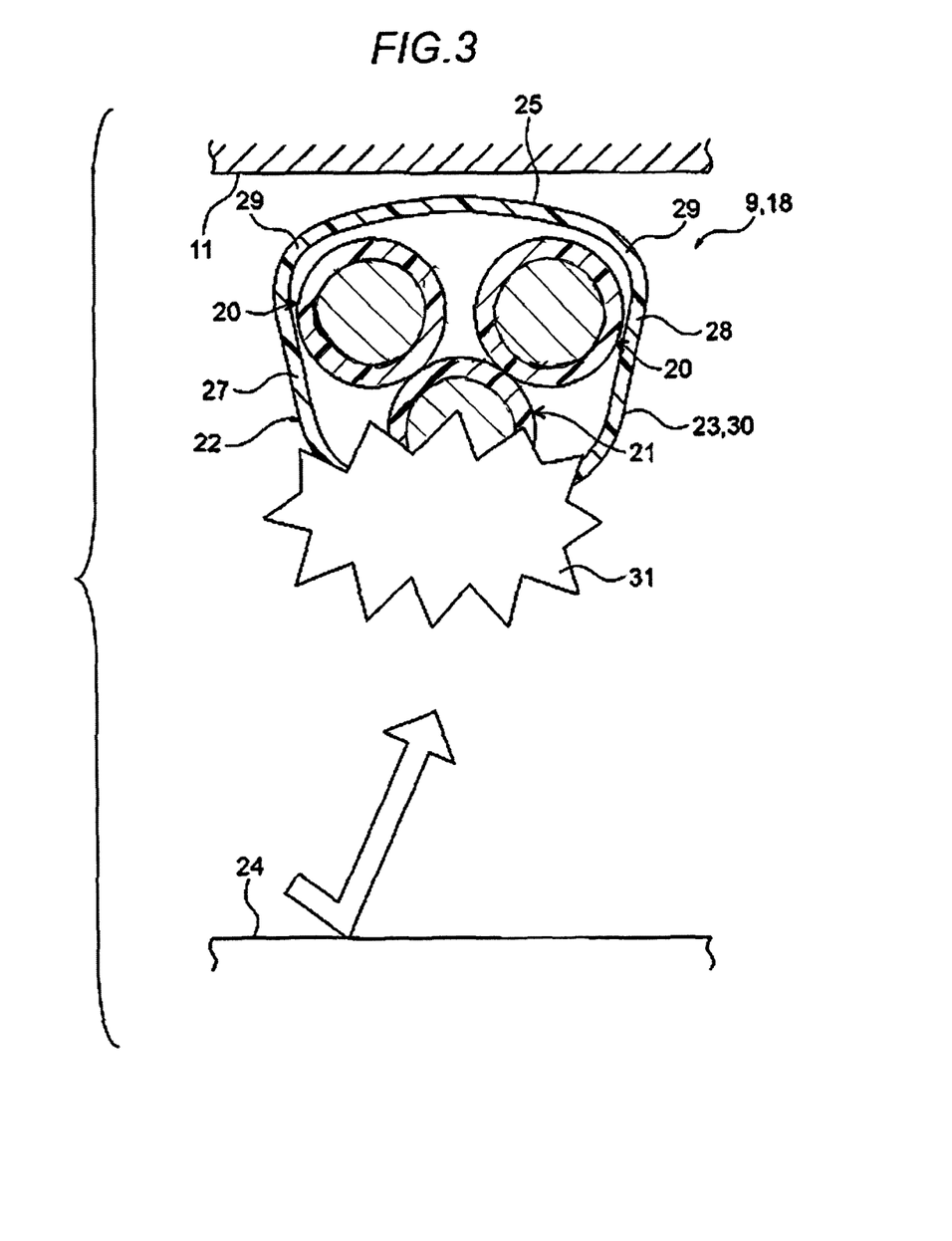
FIG. 3 is a schematic view illustrating a state where a foreign matter comes to collide from below.
Figure 4A:
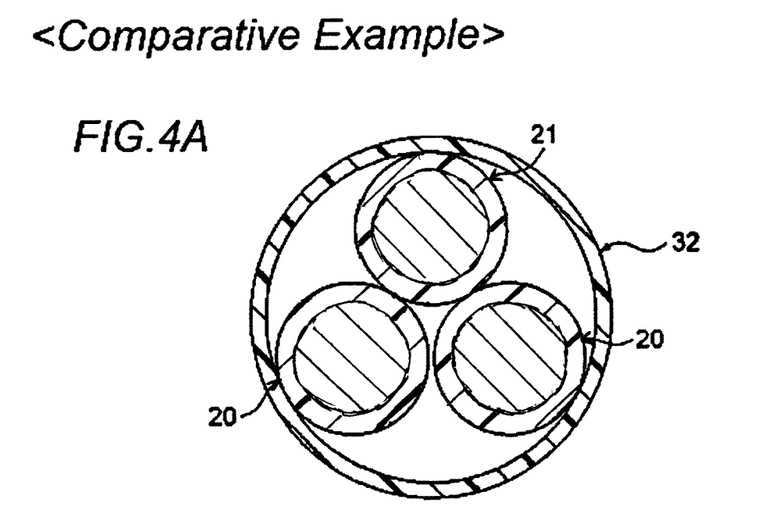
FIGS. 4A and 4B are schematic views illustrating a comparative example.
Figure 4B:
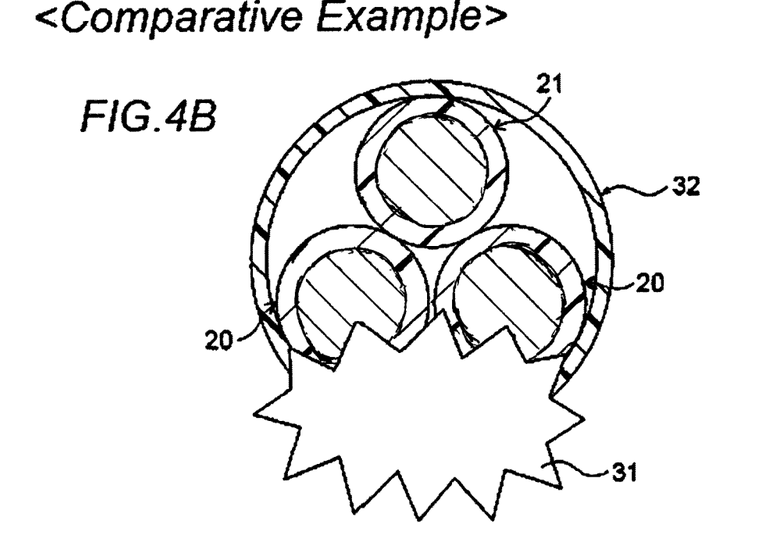

Hereinafter, referring to the drawings, an embodiment of the invention will be described. FIG. 1 is a schematic view illustrating a state where a wire harness of the invention is laid out. FIG. 2 is a sectional view taken along a line A-A in FIG. 1, and FIG. 3 is a schematic view illustrating a state where a foreign matter comes to collide with the wire harness from below. FIGS. 4A and 4B are schematic views illustrating a comparative example.

In this embodiment, the invention is applied to a wire harness which is laid out on a hybrid electric vehicle (alternatively, on an electric vehicle or a general vehicle which is driven by an internal combustion engine).

<Configuration of Hybrid Electric Vehicle 1>

In FIG. 1, reference numeral 1 denotes a hybrid electric vehicle. The hybrid electric vehicle 1 is a vehicle which is driven by a combination of two powers of an engine 2 and a motor unit 3, and electric power is supplied from a battery 5 (a battery pack) to the motor unit 3 by way of an inverter unit 4. In this embodiment, the engine 2, the motor unit 3 and the inverter unit 4 are mounted in an engine compartment 6 located in an area where front wheels and the like are disposed. The battery 5 is mounted in a rear part 7 of the hybrid electric vehicle 1 located in an area where rear wheels and the like are disposed (alternatively, the battery 5 may be mounted within a passenger compartment of the hybrid electric vehicle 1 located behind the engine compartment 6).

The motor unit 3 and the inverter unit 4 are connected together by a high-voltage wire harness 8 (a high-voltage motor cable). The battery 5 and the inverter unit 4 are also connected together by a high-voltage conductor path 20 (refer to FIG. 2) of a wire harness 9. In the wire harness 9, a middle portion 10 is laid out on an underside of a vehicle floor 11 of the hybrid electric vehicle 1 (or a vehicle body). Additionally, the middle portion 10 is laid out substantially parallel to the vehicle floor 11. The vehicle floor 11 is a known body (vehicle body) and is a so-called panel member, and through holes are formed in predetermined positions on the vehicle floor 11. The wire harness 9 is passed through these through holes in a water-tight fashion.

The wire harness 9 of this invention includes high-voltage conductor paths 20 (refer to FIG. 2), which will be described later, as a constituent part thereof. The high-voltage conductor path 20 of the wire harness 9 and the battery 5 are connected together via a junction block 12 which is provided on the battery 5. An external connection means such as a shield connector 14 which is provided at a harness terminal end 13 located at a rear end side of the wire harness 9 is electrically connected to the junction block 12. The high-voltage conductor path 20 of the wire harness 9 and the inverter unit 4 are electrically connected together via an external connection means such as a shield connector 14 which is provided at a harness terminal end 13 located at a front end side of the wire harness 9.

The motor unit 3 is configured so as to include a motor and a generator. The inverter 4 is configured so as to include an inverter and a converter. The motor unit 3 is formed as a motor assembly which includes a shield case. In addition, the inverter unit 4 is also formed as an inverter assembly which includes a shield case. The battery 5 is made up of a Ni-MH based or Li-ion based modular battery. It is possible to use an electricity storing device such as a capacitor, for example. There is, of course, imposed no specific limitation on the battery 5, provided that the battery 5 can be used in the hybrid electric vehicle 1 or an electric vehicle.

In addition to the configuration described above, the wire harness 9 includes further a low-voltage conductor path (refer to FIG. 2), which will be described later. The low-voltage conductor path 21 is provided to connect electrically a low-voltage battery 15 provided at the rear part 7 of the hybrid electric vehicle 1 and an accessory unit 17 (a unit of accessory devices) which is mounted at a front part 16 of the hybrid electric vehicle 1. The low-voltage conductor path 21 of the wire harness 9 is laid out through the vehicle floor 11 as with the high-voltage conductor paths 20 (refer to FIG. 2), which will be described later.

In the wire harness 9, reference numeral 18 denotes a harness main body. Additionally, reference numeral 19 denotes a branch wire.

<Configuration of Wire Harness 9>

In FIG. 1, the long wire harness 9 which is laid out through the vehicle floor 11 includes a harness main body 18, the shield connectors 14 (the external connection means) which are provided at both ends (the harness terminal ends 13) of the harness main body 18, branch wires 19 which branch off at a front side and a rear side of the harness main body 18, external connection means (whose reference numeral is omitted) for the branch wires 19, and retrofitted members such as clamps and grommets, not shown.

<Configuration of Harness Main Body 18>

In FIG. 2, the harness main body 18 includes two long high-voltage conductor paths 20 (a primary conductor path), one low-voltage conductor path 21 (or a bundle of low-voltage conductor paths 21) (a secondary conductor path) and an external member 22 which accommodates the two high-voltage conductor paths 20 and the one low-voltage conductor path 21 altogether for protection.

<High-Voltage Conductor Path 20>

In FIG. 2, the high-voltage conductor paths 20 are each a conductor path having a circular cross section through which a large electric current flows, and its priority in protection is set highest so that the high-voltage path 20 is not cut in any way from the viewpoint of safety. These high-voltage conductor paths 20 correspond to a first conductor path described under claims. The high-voltage conductor path 20 includes a conductor which carries electric current, an insulator which covers the conductor to separate it to prevent undesired flow of electric current therefrom, and a braid (a shield member) which exhibits a shielding function. Namely, a high-voltage conductor path having no sheath (which constitutes an example) is adopted for the high-voltage conductor path 20. Since the high-voltage conductor path 20 has no sheath, it is, of course, natural that the high-voltage conductor path 20 becomes light in weight (it is, of course, natural that the high-voltage conductor path 20 can be made light remarkably when compared with a conventional one since the high-voltage conductor path 20 is long).

<Conductor>

Although not illustrated particularly, the conductor of the high-voltage conductor path 20 has a circular cross section and is formed of copper or a copper alloy, or aluminum or an aluminum alloy. The conductor may be of either a conductor structure which is made up of strands which are twisted together or a rod-shaped conductor structure having a circular (round) cross section (for example, a conductor structure made up of a single solid round core, and in this case, a conductor path itself is formed into a rod-like shape). The conductor which is configured in the way described above has an insulator of an insulating resin material which is extruded over an external surface thereof.

<Insulator>

Although not illustrated particularly, the insulator described above is formed of a thermoplastic resin material and is extruded over an outer circumferential surface of the conductor. The insulator is formed as a cover having a circular cross section. The insulator is formed to have a predetermined thickness. Known various types of thermoplastic resin materials can be used as the thermoplastic resin material described above, and a suitable thermoplastic resin material is selected as required from polymeric materials such as polyvinyl chloride resin, polyethylene resin, polypropylene resin or the like, for example.

<Braid>

Although not illustrated particularly, the braid is provided as an outermost layer of the high-voltage conductor path 20. The braid is formed into a tubular configuration by interlacing extremely thin conductive strands. The braid is formed into a configuration and a size which enable the braid to cover an overall outer circumferential surface of the insulator from one end to the other end thereof. It should be noted that not only the braid but also metallic foil may be used as a shield member.

<Low-Voltage Conductor Path 21>

In FIG. 2, the low-voltage conductor path 21 is a conductor path of a circular cross section whose priority in protection is lower than that of the high-voltage conductor path 20, and in this embodiment, a general low-voltage electric wire is adopted for the low-voltage conductor path 21. The low-voltage conductor path 21 correspond to a second conductor path described under claims. The low-voltage conductor path 21 includes a conductor which carries electric current and an insulator which covers the conductor to separate it to prevent undesired flow of electric current therefrom. In FIG. 2, although a diameter of the low-voltage conductor path 21 is illustrated as being almost the same as that of the high-voltage conductor path 20, this is an example of the low-voltage conductor path 21.

<External Member 22>

In FIG. 2, as described above, the external member 22 is a member for accommodating the two high-voltage conductor paths 20 and the one low-voltage conductor path 21 altogether for protection, and in this embodiment, the external member 22 is formed into a tubular shape through resin molding (the external member 22 may be formed not only through resin molding using a resin material but also through drawing using a metallic material, for example. In this embodiment, the external member 22 is formed of a metallic material). The external member 22 configured in the way described above is formed into a shape free from a longitudinal cut (in other words, the external member 22 is formed into a shape free from a longitudinal slit (formed into a shape which is not a split tube)). Since the external member 22 has no longitudinal cut or slit therein, the external member 22 is formed into a shape shown in FIG. 2 which has an interior space enabling the two high-voltage conductor paths 20 and the one low-voltage conductor path 21 to pass therethrough. The interior space is formed as a space which expands to such an extent that the two high-voltage conductor paths 20 and the one low-voltage conductor path 21 are prevented from moving greatly in an uncontrollable fashion. The external member 22 of this embodiment is formed to have a straight tubular portion 23 and a flexible tubular portion (whose reference numeral is omitted) continuing to this straight tubular portion 23.

<Straight Tubular Portion 23>

In FIG. 2, the straight tubular portion 23 is formed as a portion where the two high-voltage conductor paths 20 and the one low-voltage conductor path 21 are laid out straight. The straight tubular portion 23 is adopted for at least a portion where the wire harness 9 (the harness main body 18) is laid out on the underside of the vehicle floor 11. It should be noted that the straight tubular portion 23 may be adopted for a portion located in the engine compartment 6.

<Characteristic Configuration>

The straight tubular portion 23 is formed to a length in which the straight tubular portion 23 is laid out on the underside of the vehicle floor 11. Additionally, the straight tubular portion 23 is formed to be characterized by its shape or configuration (the straight tubular portion 23 is formed into a configuration by which the invention is characterized). Specifically speaking, the straight tubular portion 23 is formed, at a portion thereof which is laid out on the underside of the vehicle floor 11, into a shape which can control the positions of the two high-voltage conductor paths 20 and the one low-voltage conductor path 21 so that the two-high voltage conductor paths 20 stay farther away from a road surface 24 than the one low-voltage conductor path 21. In other words, the straight tubular portion 23 is formed into the shape which controls the arrangement of the conductor paths on the underside of the vehicle floor 11 so that the two high-voltage conductor paths 20 stay above or upper while the one low-voltage conductor path 21 stays below or lower.

The straight tubular portion 23 of this embodiment is formed into the shape shown in FIG. 2 and has a ceiling wall 25, a bottom wall 26, a left wall 27, a right wall 28 and four continuous connecting portions 29 which connect these four walls continuously. Hereinafter, these walls will be described by looking at a cross-sectional shape of the straight tubular portion 23. The ceiling wall 25 is formed into a substantially arc-shaped wall which has a relatively large radius of curvature and which projects upwards. The ceiling wall 25 configured in the way described above is disposed on the underside of the vehicle floor 11. The bottom wall 26 is formed into a substantially arc-shaped wall which has a small radius of curvature and which projects downwards. The bottom wall 26 configured in the way described above is disposed on a side of a road surface 24. The left wall 27 and the right wall 28 are formed so as to narrow a distance therebetween as they extend towards the bottom wall 26. The four continuous connecting portions 29 are formed into an R-shape (a round shape). These ceiling wall 25 to the four continuous connecting portions 29 are formed so as to extend in an axial direction of the straight tubular portion 23.

An interior of the straight tubular portion 23 is formed partially into a configuration in which the one low-voltage conductor path 21 is accommodated in an arc portion of the bottom wall 26 while the two high-voltage conductor paths 20 are stacked on the one low-voltage conductor path 21. Further, the interior of the straight tubular portion 23 is also formed partially into a configuration which prevents the two high-voltage conductor paths 20 from moving downwards towards the bottom wall 26. The two high-voltage conductor paths 20 are disposed at all times in a position where the two high-voltage conductor paths 20 stay farther away from the road surface 24 than the one low-voltage conductor path 21. The portion of the straight tubular portion 23 where the conductor paths are disposed in the way described above will be referred to as a "conductor paths arrangement control portion 30."

<Function of the Invention>

In FIG. 3, in the harness main body 18, the two high-voltage conductor paths 20 and the one low-voltage conductor path 21 are kept disposed vertically as shown therein by the conductor paths arrangement control portion 30 which are formed on the straight tubular portion 23. For example, in the event that the hybrid electric vehicle 1 (refer to FIG. 1) rides on a curb or in the event that a foreign matter collision 31 is caused from the road surface 24, even though a damage is made to the bottom wall 26 of the conductor paths arrangement control portion 30, only the low-voltage conductor path 21 having the lower priority in protection is affected before the high-voltage conductor paths 20. The low-voltage conductor path 21 functions as it were a shield for the high-voltage conductor paths 20 having the high priority in protection, and when the low-voltage conductor path 21 is subjected to impact generated by the foreign matter collision 31, the impact is designed to be absorbed and dispersed by the low-voltage conductor path 21. Even though the low-voltage conductor path 21 is cut, as long as a damage to the high-voltage conductor paths 20 can be avoided, not only can the hybrid electric vehicle 1 be, of course, driven to run, but also a large electric current is prevented from flowing to a conductive member or a body frame, and therefore, the safety is ensured.

As shown in a comparative example in FIGS. 4A and 4B, an external member 32 (an external member 32 as a comparative example) is formed into a tubular configuration of a circular cross section, and two high-voltage conductor paths 20 are accommodated to be disposed below or lower while one low-voltage conductor path 21 is accommodated to be disposed above or upper in the external member 32 (in the same configuration and arrangement as those of the conventional example), in the event that a foreign matter collision 31 is caused from the road surface 24 (refer to FIG. 3), it is understood that the two high-voltage conductor paths 20 are easily be damaged to fail. Consequently, it is understood that forming the conductor paths arrangement control portion 30 and arranging the two high-voltage conductor paths 20 and the one low-voltage conductor path 21 as shown in FIG. 2 are effective. In other words, it is understood that the invention is effective.

Advantageous Effects of the Invention

Thus, as has been described heretofore by reference to FIGS. 1 to 4B, according to the invention, there is provided an advantageous effect that not only can the safety be ensured but also the reliability can be improved.

In addition, according to the invention, the two high-voltage conductor paths 20 are controlled to stay farther away from the road surface 24 than the one low-voltage conductor path 21, and the conductor paths arrangement control portion 30 is formed on the external member 22. Thus, a construction is provided in which no exclusive member for preventing a risk of disconnection is required. Consequently, when compared with the conventional wire harness, the invention can provide an advantageous effect that the wire harness 9 can be provided without any increase in the number of man-hours, weight and cost.

The invention can, of course, be carried out in various forms without departing from the spirit and scope of the invention.

In the description made heretofore, the two high-voltage conductor paths 20 and the one low-voltage conductor path 21 are adopted. However, a configuration may be adopted in which three high-voltage conductor paths which are aligned laterally side by side (a high-voltage shielded electric cable) and two low-voltage conductor paths (low-voltage electric wires) are adopted and an external member is formed into a configuration which controls the arrangement of these conductor paths in a vertical direction. In addition, the high-voltage conductor path (the first conductor path) may be, for example, such that a cover and a shield member are provided on a known bus bar.

DESCRIPTION OF REFERENCE NUMERALS AND SIGNS

1: hybrid electric vehicle; 2: engine; 3: motor unit; 4: inverter unit; 5: battery; 6: engine compartment; 7: rear part of hybrid electric vehicle; 8, 9 wire harness; 10: middle portion; 11: vehicle floor; 12: junction box; 13: harness terminal end; 14: shield connector; 15: low-voltage battery; 16: front part of hybrid electric vehicle; 17: accessory unit; 18: harness main body; 19: branch wire; 20: high-voltage conductor path (first conductor path); 21: low-voltage conductor path (second conductor path); 22: external member; 23: straight tubular portion; 24: road surface; 25: ceiling wall; 26: bottom wall; 27: left wall; 28: right wall; 29: continuous connecting portion; 30: conductor paths arrangement control portion; 31: foreign matter collision; 32: external member as comparative example.

What is claimed is:

1. A wire harness comprising:
   a first conductor path having a high priority in protection;
   a second conductor path having a priority in protection which is lower than that of the first conductor path; and
   an external member having a tubular shape and accommodating the first conductor path and the second conductor path altogether so as to protect them,
   wherein the external member has a form in which the first conductor path is positioned farther away from a road surface than the second conductor path within a predetermined range in a longitudinal direction thereof, and
   wherein the external member has a ceiling wall, a bottom wall, a left wall, and a right wall, in which the ceiling wall has a larger radius of curvature than the bottom wall.

2. The wire harness according to claim 1, wherein a portion of the wire harness corresponding to the predetermined range of the external member is formed according to a routing length on an underside of a vehicle floor.

3. The wire harness according to claim 1, wherein a voltage value of the first conductor path is higher than that of the second conductor path.

4. The wire harness according to claim 1, wherein the first conductor path includes two conductor paths and the second conductor path includes one conductor path.

5. The wire harness according to claim 1, wherein the first conductor path includes three conductor paths and the second conductor path includes two conductor paths.

6. The wire harness according to claim 5, wherein the three conductor paths of the first conductor path are aligned laterally side by side.

7. The wire harness according to claim 1, wherein upon an event that a vehicle rides on a curb or in an event that a foreign matter comes to collide with the wire harness from a road surface side, the second conductor path having the lower priority in protection is affected before the first conductor path having the high priority in protection is affected.

8. The wire harness according to claim 7, wherein the second conductor path functions as it were a shield for the first conductor path, and when the second conductor path is subjected to impact, the impact so received is absorbed and dispersed by the second conductor path.

* * * * *